（12）United States Patent
McCloy

(10) Patent No.: US 9,664,254 B2
(45) Date of Patent: May 30, 2017

(54) SPLIT RING CARRIER WITH ECCENTRIC PIN WITH SPRING COMPLIANCE AND SPEED DEPENDENCE

(71) Applicant: BorgWarner Inc., Auburn Hills, MI (US)

(72) Inventor: Chad McCloy, Cortland, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/162,715

(22) Filed: May 24, 2016

(65) Prior Publication Data

US 2016/0348759 A1    Dec. 1, 2016

Related U.S. Application Data

(60) Provisional application No. 62/168,161, filed on May 29, 2015.

(51) Int. Cl.
| | |
|---|---|
| *F16H 57/08* | (2006.01) |
| *F16H 1/28* | (2006.01) |
| *F01L 1/344* | (2006.01) |
| *F01L 9/04* | (2006.01) |

(52) U.S. Cl.
CPC ............ *F16H 1/2863* (2013.01); *F01L 1/344* (2013.01); *F01L 9/04* (2013.01)

(58) Field of Classification Search
CPC ............ F16H 1/2863; F01L 9/04; F01L 1/344
See application file for complete search history.

(56) References Cited

U.S. PATENT DOCUMENTS

| | | | |
|---|---|---|---|
| 3,138,035 A * | 6/1964 | Sivaslian | ................ F16H 55/18 74/440 |
| 7,261,667 B2 | 8/2007 | Berger | |
| 8,313,411 B2 | 11/2012 | Schafer | |
| 8,359,114 B2 * | 1/2013 | Steingart | ................ A61C 1/082 700/182 |
| 9,033,849 B2 * | 5/2015 | Klein | .................... F16H 57/082 475/347 |
| 9,366,317 B2 * | 6/2016 | Croce | ................... F16H 57/082 |

(Continued)

FOREIGN PATENT DOCUMENTS

| | | |
|---|---|---|
| WO | 2014092963 | 6/2014 |
| WO | 2014092973 | 6/2014 |

(Continued)

*Primary Examiner* — David J Hlavka
(74) *Attorney, Agent, or Firm* — Brown & Michaels, PC

(57) ABSTRACT

A split ring planetary drive of an electric phaser includes at least one planet gear adjuster and at least one load generator. The load generator biases the planet gear adjuster, such that at a low rotational speed, the planet gear adjuster applies a force on the planet gear to take up the backlash between the planet gear and the ring gears. As the rotational speed increases, the inertia of a mass of the planet gear adjuster generates an increasing force opposing the force of the load generator, causing the planet gear adjuster to move at least one planet gear to a position where the at least one planet gear no longer takes up the backlash. In some embodiments, the planet gear adjuster includes an eccentric pin and an extension arm. In other embodiments, the planet gear adjuster includes a pivot support for a pair of inner and outer planet gears.

13 Claims, 11 Drawing Sheets

(56) References Cited

U.S. PATENT DOCUMENTS

2004/0154422 A1\* 8/2004 Menjak ................ B62D 1/105
  74/440
2007/0093354 A1 4/2007 Berger

FOREIGN PATENT DOCUMENTS

| WO | 2015171308 | 11/2015 |
| WO | 2015187469 | 11/2015 |

\* cited by examiner

SPLIT RING CARRIER WITH ECCENTRIC PIN WITH SPRING COMPLIANCE AND SPEED DEPENDENCE

BACKGROUND OF THE INVENTION

Field of the Invention

The invention pertains to the field of electric variable cam timing actuators or "phasers" (e-phasers). More particularly, the invention pertains to an electric phaser with an anti-backlash planetary drive.

Description of Related Art

A variable cam timing (VCT) system measures the angular displacement, or phase angle, of a camshaft, relative to the crankshaft to which it is operatively connected and then alters the phase angle to adjust various engine characteristics in response to demands for either an increase or a reduction in power. Typically, there is a feedback loop in which the desired values of such engine characteristics are measured against their existing values, and changes are effected inside the engine in response to any variances. To accomplish this, modern automobiles usually have one or more Electronic Control Units (ECU), which constantly analyze data fed into them from various parts of the engine or from other parts of the automobile, such as, for example, exhaust gas sensors, pressure sensors, and temperature sensors. A control signal is then emitted in response to such data. For example, with regard to VCT systems, as changes occur in engine or external conditions, the angular displacement between the camshaft and the crankshaft is adjusted accordingly.

A VCT system includes a cam phasing control device, sometimes referred to as a phaser, control valves, control valve actuators, and control circuitry. VCT is a process that refers to controlling and varying, when desirable, the angular relationship (the "phase") between the drive shaft and one or more camshafts, which control the engine's intake and exhaust valves. The current state of the art for automotive camshaft phasers is either an Oil Pressure Actuated (OPA) cam phaser or a Cam Torque Actuated (CTA) cam phaser, with the later having some advanced features, such as fast operation with low oil pressure and a mid-position lock feature.

Many automotive companies are now working on electric phasers (e-phasers) for camshafts to improve the actuation rate and range of authority and operation either before engine start or during engine cranking. An e-phaser is driven by an electric motor to control and vary the angular relationship between the drive shaft and one or more camshafts. In response to input signals, the electric phaser adjusts the camshaft to either advance or retard engine timing.

These systems have a high ratio gear train to phase the camshaft relative to the crankshaft by means of a motor spinning at cam speed. When the motor spins faster than the camshaft, the phaser phases the camshaft relative to the crankshaft in one direction, and as the motor slows down, the cam-to-crank phase moves in the opposite direction. These high ratio gear trains include cycloidal-style gear trains, harmonic gear trains, or some other type of high ratio epicyclical gear trains.

U.S. Pat. No. 7,261,667, entitled "System and Method for Reducing Backlash in a Planetary Gear Set" and issued Aug. 28, 2007 to Berger, discloses a planetary gear set with a planet carrier including a first part that supports at least one forward-torque carrying planet gear that has at least one tooth contacting a drive side of gear teeth of an associated sun gear and ring gear and a second part that supports at least one reverse-torque carrying gear that has at least one tooth contacting a coast side of gear teeth of the associated sun gear and ring gear. The second part of the carrier is rotationally biased relative to the first part to reduce or eliminate effective backlash of the gear set.

U.S. Pat. No. 8,313,411, entitled "Backlash-free Planetary Gear Unit with Split Planet Gears, which are Preloaded by Spring Bars Arranged Parallel to the Planetary Axis of Rotation" and issued Nov. 20, 2012 to Schafer, discloses a planetary gear unit including a sun gear, an internal gear, and at least one planet gear in mesh with the sun gear and the internal gear. The planet gear is arranged on a planet carrier such that it is rotatable about a planetary axis of rotation. The toothed planet gear has a plane of division oriented perpendicular to the planetary axis of rotation, by means of which the planet gear is divided into a first planet subgear and a second planet subgear. The first planet subgear is preloaded relative to the second planet subgear by a spring bar arranged in these two planet subgears substantially parallel to the planetary axis of rotation. A plurality of spring bars is arranged around the planetary axis of rotation.

WO 2014/092963, by Showalter, entitled "Split Ring Gear Planetary Cam Phaser" and published Jun. 19, 2014, discloses a cam phaser for dynamically adjusting a rotational relationship of a camshaft of an internal combustion engine with respect to an engine crankshaft. The cam phaser can include a planetary gear system having a split ring gear, including a sprocket ring gear to be driven by the engine crankshaft through an endless loop power transmission member and a camshaft ring gear connectable for rotation with the camshaft. A sun gear can be located concentric with the split ring gear, and a number of planet gears can be in meshing engagement between the sun gear and the split ring gear. The camshaft ring gear can have a different number of teeth, greater or lesser, than the sprocket ring gear by a value corresponding to a multiple of the number of planet gears to provide tooth alignment at an engagement position of each of the planet gears.

The above-mentioned references are hereby incorporated by reference herein.

SUMMARY OF THE INVENTION

A split ring planetary drive of an electric phaser includes at least one planet gear adjuster and at least one load generator. The load generator biases the planet gear adjuster, such that at a low rotational speed, the planet gear adjuster applies a force on the planet gear to take up the backlash between the planet gear and the ring gears. As the rotational speed increases, the inertia of a mass of the planet gear adjuster generates an increasing force opposing the force of the load generator, causing the planet gear adjuster to move at least one planet gear to a position where the at least one planet gear no longer takes up the backlash. In some embodiments, the planet gear adjuster includes an eccentric pin and an extension arm. In other embodiments, the planet gear adjuster includes a pivot support for a pair of inner and outer planet gears.

In some embodiments, the split ring planetary drive includes a sun gear, a plurality of planet gears, a sprocket ring gear, a camshaft ring gear, a carrier, at least one planet gear adjuster, and at least one load generator. The sun gear is driven to rotate around a sun axis by the electric motor and includes a plurality of sun gear teeth. The planet gears are arranged around the sun gear with each planet gear including a plurality of planet teeth maintaining the planet gear in meshing engagement with the sun gear. The sprocket ring gear is driven by the crankshaft and includes a plurality of sprocket ring gear teeth maintaining the sprocket ring gear in meshing engagement with the planet gears. The camshaft ring gear is rotatable with the camshaft and includes a plurality of camshaft ring gear teeth maintaining the camshaft ring gear in meshing engagement with the planet gears. The carrier is rotatable around the sun axis and rotatably receiving the planet gears. The planet gear adjuster includes an eccentric pin, a pair of pin extensions, and an extension arm. The eccentric pin has a cylindrical shape and extends through a center of a first planet gear of the plurality of planet gears. The pair of pin extensions extend from a top and a bottom of the eccentric pin and have circumferential surfaces off-center with respect to a center of an outer cylindrical surface of the eccentric pin. The pin extensions rotatably mount in the carrier such that the planet gear adjuster is rotatable with respect to the carrier and with respect to the first planet gear. The extension arm extends from the eccentric pin. The load generator is coupled to the carrier and applies a torque load to the extension arm to maintain the planet gear adjuster at a first position at a low rotational speed of the carrier, such that, the eccentric pin forces the first planet gear toward the sprocket ring gear and the camshaft ring gear to reduce backlash between the first planet gear and the camshaft ring gear and between the first planet gear and the sprocket ring gear in the split ring planetary drive. A difference between a number of the camshaft ring gear teeth and a number of the sprocket ring gear teeth is a multiple of a number of the planet gears to provide tooth alignment at an engagement position of each of the planet gears.

In some embodiments, the planet gears include a plurality of inner planet gears and a plurality of outer planets and the planet gear adjuster includes a pivot support. The inner planet gears are arranged around the sun gear and include a plurality of inner planet teeth maintaining the inner planet gear in meshing engagement with the sun gear. The outer planet gears each include a plurality of outer planet teeth maintaining the outer planet gear in meshing engagement with one of the plurality of inner planet gears, the sprocket ring gear, and the camshaft ring gear. The pivot support couples a first inner planet gear of the plurality of inner planet gears to a first outer planet gear of the plurality of outer planet gears. The pivot support is rotatably coupled to the carrier to rotate with respect to the carrier. The load generator is coupled to the carrier and applies a torque load to the pivot support to maintain the planet gear adjuster at a first position at a low rotational speed of the carrier, such that, the pivot support forces the first inner planet gear toward the sun gear and the first outer planet gear toward the sprocket ring gear and the camshaft ring gear to reduce backlash between the first inner planet gear and the sun gear, between the first outer planet gear and the camshaft ring gear, and between the first outer planet gear and the sprocket ring gear in the split ring planetary drive.

In some embodiments, a method of controlling backlash in an electric phaser for dynamically adjusting a rotational relationship of a camshaft with respect to a crankshaft of an internal combustion engine includes applying a torque load, by way of a load generator coupled to the carrier, to an extension arm such that the load generator maintains the extension arm at a first position at a low rotational speed of the carrier.

In some embodiments, the electric phaser may be comprised of a planetary gear reducer or adjuster. The planetary gear reducer comprises: a planet carrier being rotatable with a plurality of planetary gears and connected to the planetary gears through pins, a second ring gear rotatable with a second shaft, the second ring gear comprising a plurality of second ring gear teeth maintaining the second ring gear in meshing engagement with the planetary gear teeth of each of the planetary gears; a first ring gear rotatable with a first shaft, the first ring gear comprising a plurality of first ring gear teeth maintaining the first ring gear in meshing engagement with the planetary gear teeth of each of the planetary gears; a spring having a first end, a second end and a torque, with the first end of the spring being connected to the planet carrier and the second end of the spring being connected to the first ring gear, for driving the planet carrier in a first direction; and a electronic brake in contact with the planet carrier for applying a torque to the planet carrier. When the torque of the brake is less than the torque of the spring, the spring rotates the planet carrier in first direction, rotating the planet carrier at speed different than a speed of the first ring gear and second ring gear, causing a different speed of the first ring gear to the second ring gear which causes a cam phase shift function in a first direction. When the torque of the brake is greater than the torque of the spring, the brake causes the planet carrier to drag and rotate at speed different than a speed of the first ring gear and second ring gear, causing a different speed of the first ring gear to the second ring gear which causes a cam phase shift function in a second direction.

The planetary gear reducer with brake may further include an eccentric pin, a pair of pin extensions, and an extension arm. The eccentric pin has a cylindrical shape and extends through a center of a first planet gear of the plurality of planet gears. The pair of pin extensions extend from a top and a bottom of the eccentric pin and have circumferential surfaces off-center with respect to a center of an outer cylindrical surface of the eccentric pin. The pin extensions rotatably mount in the carrier such that the planet gear adjuster or reducer is rotatable with respect to the carrier and with respect to the first planet gear. The extension arm extends from the eccentric pin. The load generator is coupled to the carrier and applies a torque load to the extension arm to maintain the planet gear reducer at a first position at a low rotational speed of the carrier, such that, the eccentric pin forces the first planet gear toward the sprocket ring gear and the camshaft ring gear to reduce backlash between the first planet gear and the camshaft ring gear and between the first planet gear and the sprocket ring gear. A difference between a number of the camshaft ring gear teeth and a number of the sprocket ring gear teeth is a multiple of a number of the planet gears to provide tooth alignment at an engagement position of each of the planet gears.

DETAILED DESCRIPTION OF THE INVENTION

Figure 1:
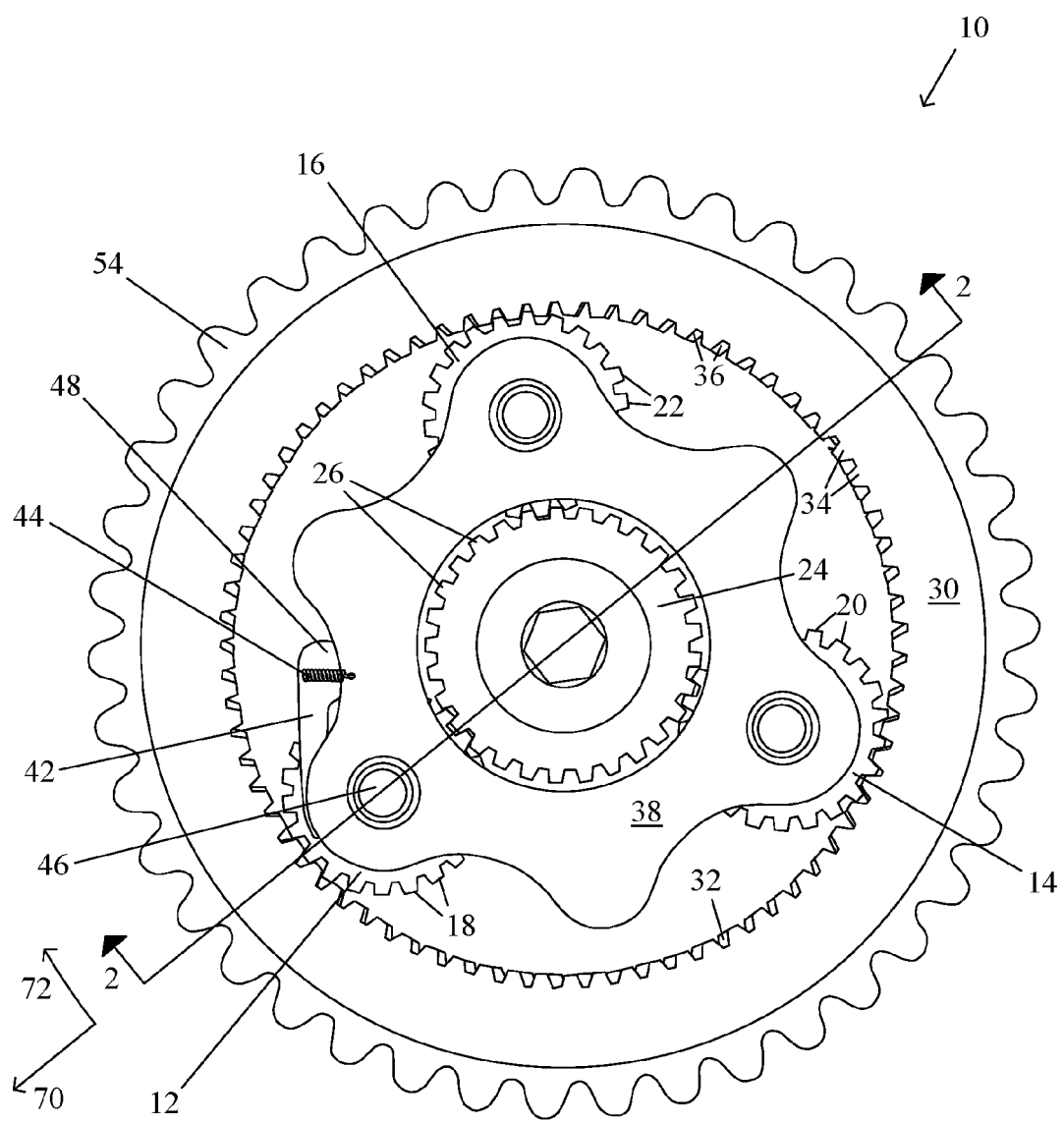
FIG. 1 shows a schematic front view of a planetary drive system with a single planet gear adjuster.

In one embodiment, a split ring gear train is mounted on the camshaft and is subject to the camshaft torsional as the camshaft rotates. The torque path is from one ring gear to the planet gear and to the other ring gear. Because of the oscillating torques, these gear trains can have noise issues as the input torque oscillates back and forth, causing the two ring gears to load and unload against the planet gears. A conventional solution to mitigate the noise issues is to make very precise gears and reduce the carrier center distance such that the backlash of the ring gears to planet gear is greatly reduced. This means that the roundness of the ring gear must be held very tight, otherwise binding can occur. This method can be expensive, as the cost of these precise gears and select fit parts can make the assembly cost prohibitive.

One preferred solution described herein to reduce backlash is to make at least one of the carrier pins eccentric such that it may be rotated with an extension arm to push one of the planet gears into the ring gear. In some embodiments, a physical stop limits rotation or outward motion of the extension arm to prevent the extension arm from contacting either of the ring gears. The physical stop preferably extends from the carrier. With this design, the pin may be configured to rotate with an extension arm having a spring at the end and connected to the carrier. The spring forces the planet gears outward towards the ring gears and reduces the backlash noise associated with the oscillating torques.

In many applications, the NVH (noise-vibration-harshness) due to backlash is only an issue at low speed. The noise of the phaser due to backlash at higher speeds is drowned out by other valve train noise, so the backlash may be increased at higher speeds without a negative effect to overall noise levels. Force may be removed at higher speeds to reduce friction losses, since performance is more of an issue at high speeds, because a higher motor speed is required. In testing, it was found that the NVH of the phaser was no longer an issue by the time the motor was running at 2000 RPM. A reduced outward force decreases the friction drag of the planet gears to the ring gears and thus increases the actuation speed over a system with a fixed force biasing the planet gears towards the ring gears. In some embodiments, the system also allows for reduced tolerances of the remaining pin placements on the carrier and offers a lower cost solution.

In some embodiments, a mass is used to work against the load that is forcing the gears into mesh. The extension arm is preferably designed with a mass on the end such that as the speed of the phaser increases, the inertia of the extension arm increasingly opposes the load generator, which reduces the outward force of the planet gears on the ring gears. At low rotational speeds, the biasing force holds the extension arm closer to the axis of rotation, a position in which the pin applies a force on the planet gears toward engagement with the ring gears to take up backlash between the planet gears and the ring gears. Unlike conventional planetary drive pins that are staked not to turn with respect to the carrier, the pin in these embodiments is not staked so that it is able to turn with respect to the carrier. As the speed increases, the weight on the extension arm works against the load generator to extend the extension arm farther away from the axis of rotation of the carrier, which causes the pin to rotate and the pin force on the planet gear to be reduced as a result of the eccentricity of the pin. In some embodiments, roller bearings may be used to reduce the turning friction of the pins with respect to the carrier. The spring and mass are preferably designed so that they work in conjunction with each other over the relevant operational range of rotational speeds.

In some embodiments, low rotational speeds are motor speeds below a predetermined motor speed and high rotational speeds are motor speeds at or above the predetermined motor speed. In such embodiments, the predetermined motor speed corresponds to the motor speed at which the extension arm has enough inertia to oppose the spring and reach a point where the planetary drive adjuster no longer moves the planet gear outward toward the ring gear to take up backlash. In the interest of efficiency, the predetermined motor speed is preferably a motor speed at or below the vehicle cruising speed such that the planetary drive adjuster is not adjusting the planetary gear at the vehicle cruising speed. The predetermined motor speed may vary from vehicle to vehicle or system to system, with a typical value being 1500 RPM.

In some embodiments, the carrier is piloted and each planet gear includes a loaded extension arm to take up the backlash between the planet gear and the ring gears.

In other embodiments, the carrier is not piloted and a single loaded extension arm on one of the planet gears biases that planet gear toward the ring gears and the remaining planet gears, by way of the carrier, toward the ring gears.

The loading of the extension arm may be on axis or off axis within the spirit of the present invention.

An alternative preferred solution described herein to reduce backlash is to use pairs of planet gears spring-loaded to engage the sun and ring gears and take up any backlash between both the planet gears and the sun and the planet gears and the ring gears. An inner planet gear engages the sun gear. An outer planet gear engages the inner planet gear and the ring gears. A pivot support couples the inner planet gear to the outer planet gear and the pair of planets gears to the carrier. A spring or spring and damper attached to the inner planet gear or the outer planet gear rotationally biases the two planet gears to take up backlash between both the planet gears and the sun and the planet gears and the ring gears.

Since the pair of planet gears reverses the rotational direction of the gearing with respect to a single planet gear, all of the planets are pairs of planet gears in this embodiment.

In some embodiments, a mass coupled to the pivot support provides a similar function to the mass on the extension arm in the previous embodiment. One, more than one, or all of the planet gear pairs may each have a mass within the spirit of the present invention. In some embodiments, a physical stop limits rotation or outward motion of the extension arm to prevent the extension arm or mass from contacting either of the ring gears.

An electric phaser dynamically adjusts the rotational relationship of the camshaft with respect to the crankshaft of an internal combustion engine. The electric phaser includes a planetary drive system driven by an electric motor. The planetary drive system is preferably a split ring planetary drive system with a sprocket ring gear driven by the engine crankshaft and a camshaft ring gear concentric with the sun gear and connected to the camshaft. The planetary drive system also includes a centrally-located sun gear, a plurality of planet gears engaging the sun gear, and at least one carrier connected to at least two of the planet gears. At least two of the planet gears are loaded with respect to each other to reduce backlash in the planetary drive system. The electric motor is preferably a brushless DC motor.

There is a tooth count difference between the camshaft ring gear and the sprocket ring gear that is divisible by the number of planet gears to provide tooth alignment at an engagement position of each of the planetary gears. The camshaft ring gear moves at a slightly different speed than the sprocket ring gear due to the tooth difference when the sun gear rotates at a different speed than the camshaft. In a preferred embodiment, the planetary drive system has three planet gears and there is a three tooth count difference between the camshaft ring gear and the sprocket ring gear in order to maximize the phasing resolution between the ring gears.

In some embodiments, an electric motor is connected to the sun gear to drive the sun gear in relation to the planet gears. When the electric motor rotates the sun gear at the same speed as the camshaft ring gear, a constant phase position is maintained between the crankshaft and the camshaft. Under these conditions, the planetary gear assembly rotates as a unit with no relative movement between the sun gear and the planet gears or between the planet gears and the ring gears, which minimizes frictional losses. Adjusting the electric motor speed with respect to the sprocket ring gear/camshaft ring gear/camshaft adjusts the phase of the camshaft with respect to the crankshaft.

In some embodiments, the camshaft ring gear has more teeth than the sprocket ring gear. In such embodiments, when the electric motor rotates the sun gear at a speed faster than the speed of the camshaft, the phaser is moving in the advancing direction. When the electric motor rotates the sun gear at a speed slower than the speed of the camshaft, the phaser is moving in the retarding direction.

In other embodiments, the sprocket ring gear has more teeth than the camshaft ring gear. In such embodiments, when the electric motor rotates the sun gear at a speed faster than the speed of the camshaft, the phaser is moving in the retarding direction. When the electric motor rotates the sun gear at a speed slower than the speed of the camshaft, the phaser is moving in the advancing direction.

In some embodiments, a single ring gear may be present with a fixed sun gear which is driven by a low speed motor.

In some embodiments, the electric motor is a brake.

The sprocket ring gear, the camshaft ring gear, the planet gears, and the sun gear are arranged in a planetary gear drive connection preferably having a high numerical gear ratio to allow accurate phase angle adjustment with a relatively low driving torque requirement for the electric motor. The sprocket ring gear is preferably driven by the engine crankshaft through a sprocket and an endless loop power transmission chain, and the camshaft ring gear is preferably connected to rotate with the camshaft.

Referring to FIG. 1, a split ring gear planetary drive 10 includes planet gears 12, 14, 16 with planet gear teeth 18, 20, 22, respectively, a centrally located sun gear 24 with sun gear teeth 26, and a split ring gear including a sprocket ring gear 30 and a camshaft ring gear 32. A sprocket 54 with sprocket teeth extends radially outward from the sprocket ring gear 30. The ring gears 30, 32 have different numbers of teeth 34, 36, where the difference in the number of teeth is a multiple of the number of planet gears 12, 14, 16. The ring gear teeth 34, 36 have profiles to allow the ring gears 30, 32 to mesh properly with the planet gears 12, 14, 16. The planet gears 12, 14, 16 are maintained in a fixed rotational relationship to each other by a planetary carrier 38.

A load generator 44 is attached at one end to the planetary carrier 38 and attached at the other end to an extension arm 42. A planet gear adjuster includes the extension arm 42 and an eccentric pin 46. The extension arm 42 extends from the eccentric pin 46, around which the first planet gear 12 is mounted. In some embodiments, the load generator 44 is a tension coil spring. The load generator 44 biases the extension arm 42 of the eccentric pin 46 toward the carrier 38 to provide a load on the first planet gear 12 toward the ring gears 30, 32 by way of the eccentric pin 46 at low rotational speeds of the carrier 38, and as a result of the eccentricity of the pin 46, to take up the backlash between the first planet gear 12 and the ring gears 30, 32. Since the carrier 38 is not piloted, the carrier 38 and the other planet gears 14, 16 are loaded in the opposite direction to take up the backlash between the other planet gears 14, 16 and the ring gears 30, 32. A mass 48 at the distal end of the extension arm 42 provides an opposing force to the load generator 44 at high rotational speeds of the carrier as a result of inertia. The forces on the planet gears 12, 14, 16 and the planetary carrier 38 as a result of the load generator 44 and eccentric pin 46 may be only in the radial direction 70 or may be in both the radial direction 70 and the circumferential direction 72.

Figure 2:
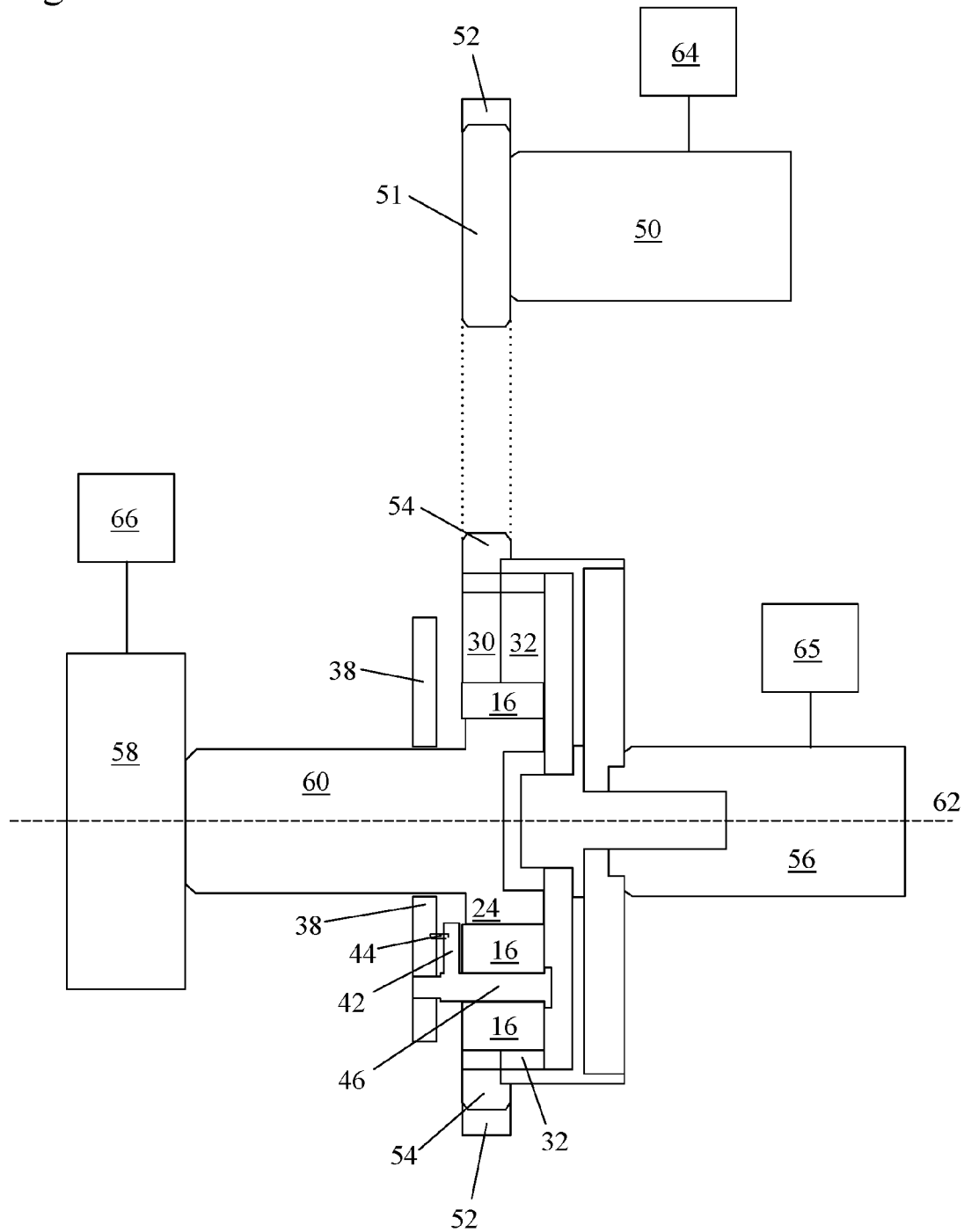
FIG. 2 shows a schematic view of an electric phaser including a schematic cross sectional view of the planetary drive system of FIG. 1 along line 2-2.

Referring to FIG. 2, a crankshaft 50 is rotationally engaged through a crankshaft sprocket 51 with crankshaft sprocket teeth and a timing chain 52 to the sprocket ring gear 30 through the sprocket 54 with sprocket teeth, and the camshaft 56 is rotationally engaged to the camshaft ring gear 32. An electric motor 58 is rotationally engaged with the sun gear 24 by way of an output shaft 60. When the sun gear 24 is rotated by the electric motor 58 around its axis 62 at the same speed as either of the ring gears 30, 32, since both ring gears 30, 32 rotate in unison, a constant cam phase position is maintained. When the sun gear 24 is driven at a different speed from the ring gears 30, 32 by the electric motor 58, a slightly different speed of one ring gear to the other ring gear causes a cam phase shift function. In this way, a very high numerical ratio is obtained and the camshaft 56 is phased either plus or minus from the nominal rotational relationship of the crankshaft 50 to the camshaft 56.

The cam phaser is preferably used to dynamically adjust the rotational relationship of the camshaft 56 to the engine crankshaft 50 to improve the fuel efficiency of the engine. Sensors 64, 65, one 64 on the crankshaft 50 and one 65 on the camshaft 56 are preferably used as feedback to a motor controller 66 to measure the current position of the camshaft 56 relative to the crankshaft 50 to determine what adjustment, if any, is desired at any point in time to achieve optimal engine efficiency.

Figure 3:
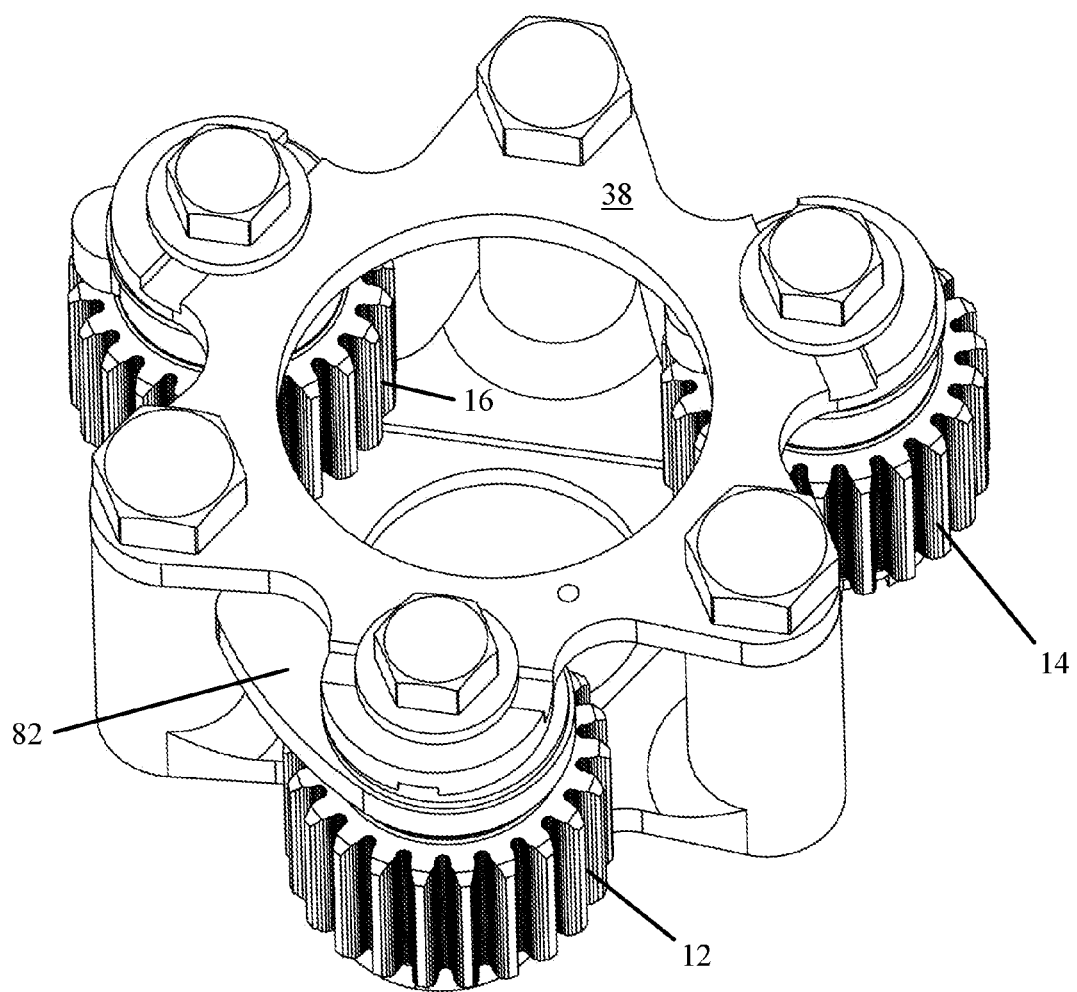
FIG. 3 shows a perspective view of the carrier and planet gears of the planetary drive system of FIG. 1 with an extension arm having an alternate shape and in a retracted position.

FIG. 3 shows a schematic three-dimensional perspective view the carrier 38, planet gears 12, 14, 16, and extension arm 82 of the planetary drive system 10 of FIG. 1 in a position where in the engine is operating at a low rotational speed. For clarity, the load generator 44 is not shown in FIG. 3. The extension arm 82 is in a retracted position in FIG. 3.

Figure 4:
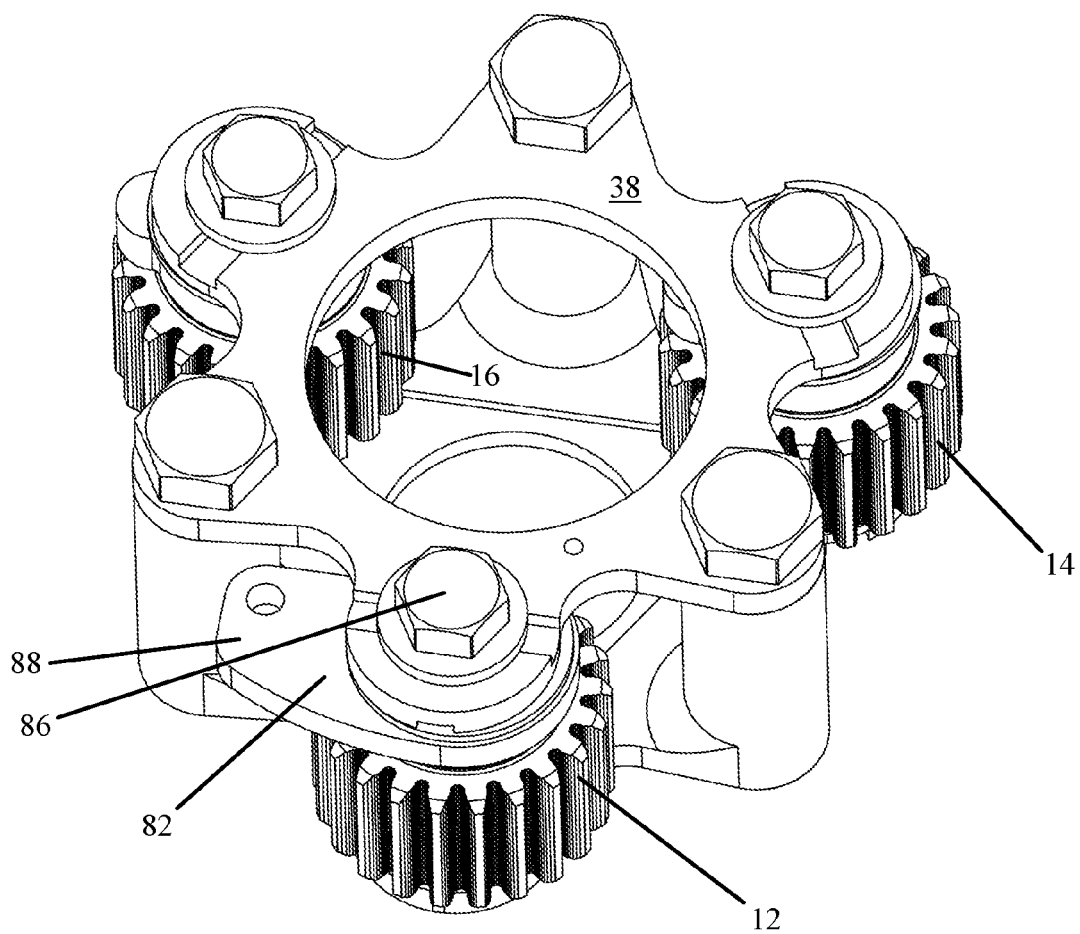
FIG. 4 shows a perspective view of the carrier, planet gears, and planet gear adjuster of FIG. 3 with the extension arm in an extended position.

As the rotational speed of the carrier 38 increases, the inertia of the mass 88 on the end of the extension arm 82 generates an increasing force opposing the force of the load generator 44 to move the extension arm 82 away from the axis of rotation to a position such as shown in FIG. 4. This movement of the extension arm 82 rotates the eccentric pin 86 to a position where the eccentric pin 86 no longer applies the force on the planet gear 12 to take up the backlash between the planet gear 12 and the ring gears 30, 32. For clarity, the load generator 44 is not shown in FIG. 4.

Figure 5:
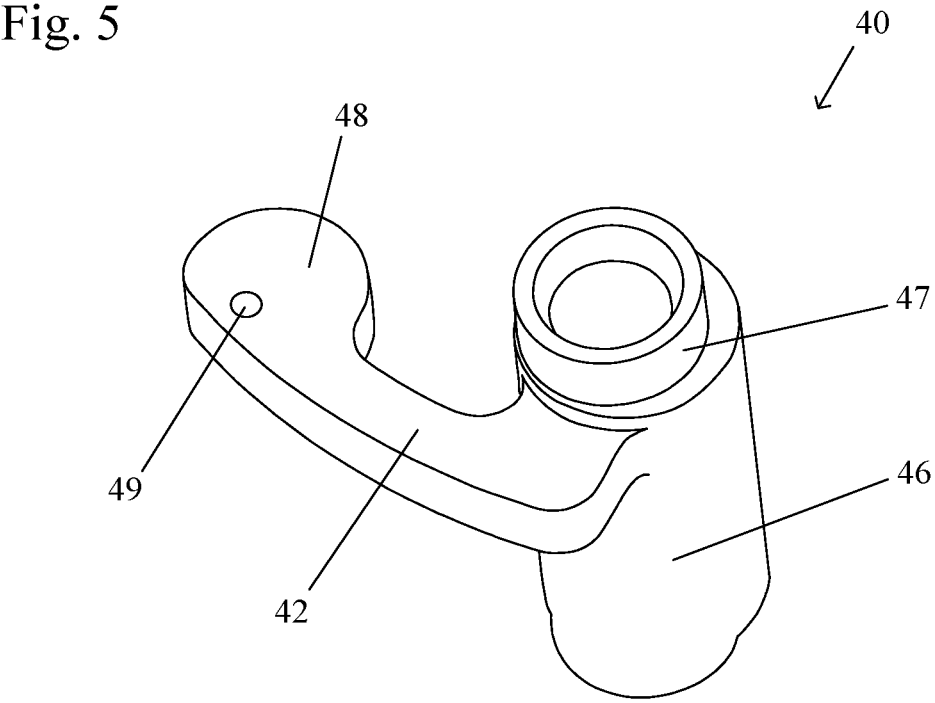
FIG. 5 shows a schematic perspective view of the planet gear adjuster of the planetary drive system of FIG. 1.
Figure 6:
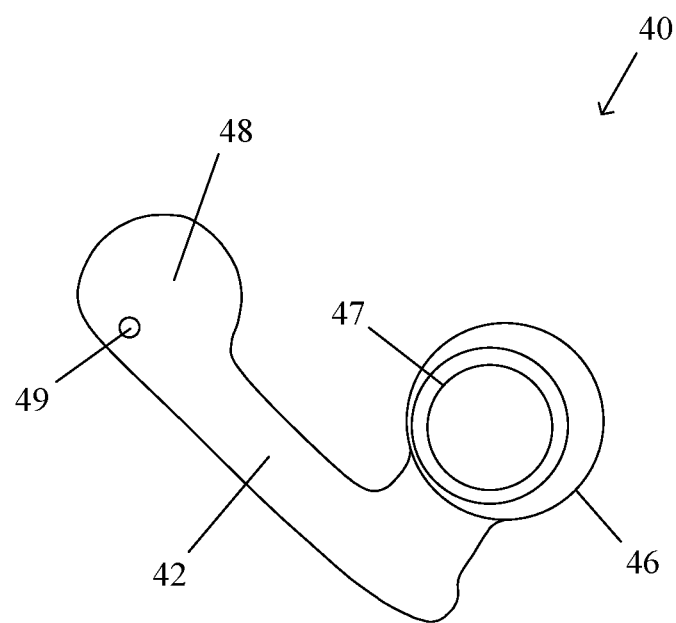
FIG. 6 shows a schematic top view of the planet gear adjuster of FIG. 5.

FIG. 5 and FIG. 6 show a planet gear adjuster 40 with the extension arm 42 extending from the eccentric pin 46. A hole 49 in the mass 48 at the distal end of the extension arm 42 allows attachment of the load generator 44 to the extension arm 42. As best seen in FIG. 6, pin extensions 47 at the top and bottom of the eccentric pin 46 are off-center with respect to the eccentric pin 46. The pin extensions 47 mount into holes on the carrier 38. As a result of the pin extensions 47 being off-center with respect to the eccentric pin 46, when the extension arm 42 moves to cause the eccentric pin 46 to rotate, the center of the eccentric pin 46 and the center of the planet gear 12 simultaneously move with respect to the carrier 38. The degree of eccentricity affects the amount of movement of the center of the planet gear 12 and, hence, the degree to which the backlash between the planet gear 12 and the ring gears 30, 32 is taken up.

Figure 7:
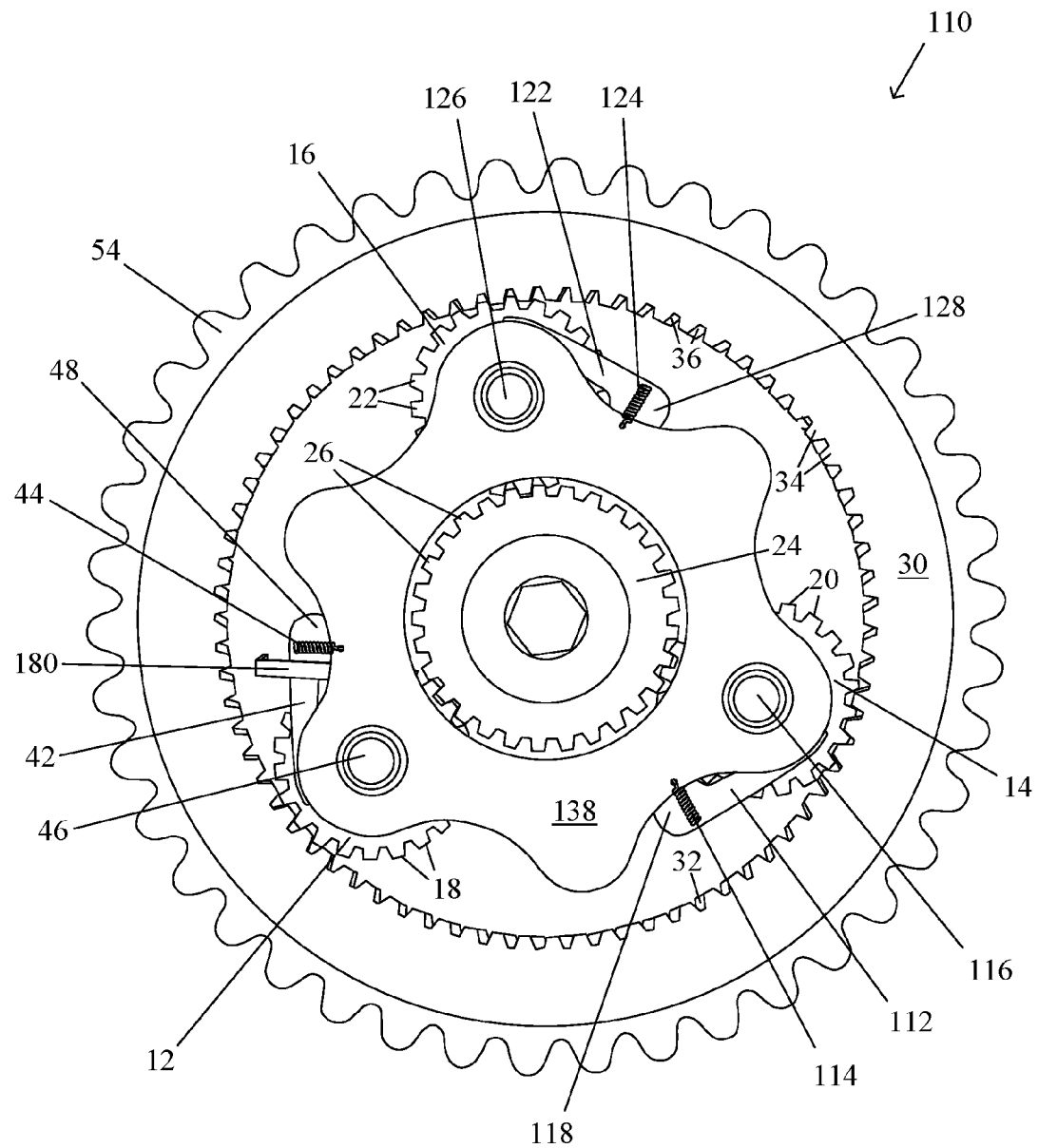
FIG. 7 shows a schematic front view of a planetary drive system with a planet gear adjuster on each planet gear.

FIG. 7 shows a split ring gear planetary drive 110 with a piloted carrier 138. In this embodiment, load generators 44, 114, 124 are attached at one end to the planetary carrier 138 and attached at the other end to extension arms 42, 112, 122, respectively. The extension arms 42, 112, 122 extend from eccentric pins 46, 116, 126, around which the planet gears 12, 14, 16 are mounted, respectively. In some embodiments, the load generators 44, 114, 124 are tension coil springs. The load generators 44, 114, 124 bias the extension arms 42, 112, 122 of the pins 46, 116, 126 toward the carrier 138 to provide loads on the planet gears 12, 14, 16 toward the ring gears 30, 32 at low rotational speeds of the carrier 138, as a result of the eccentricity of the pins 46, 116, 126 to take up the backlash between the planet gears 12, 14, 16 and the ring gears 30, 32. A mass 48, 118, 128 at the distal end of each of the extension arms 42, 112, 122 provides an opposing force to the load generators 44, 114, 124 at high rotational speeds as a result of inertia.

A physical stop 180, extending from the carrier 138, limits rotation or outward motion of the extension arm 42 to prevent the extension arm 42 from contacting either of the ring gears 30, 32. The physical stop 180 may also serve to prevent too much of an increase in backlash in the system at higher speeds, since excessive backlash may cause noise or oscillations. The physical stop 180 is shown as an L-shaped bracket, but any shape that serves as a physical barrier to limit the path of the extension arm 42 may be used within the spirit of the present invention. Although a physical stop 180 is only shown on one extension arm 42, all of the extension arms 42, 112, 122 preferably include a physical stop 180. A physical stop 180 may be used with any of the planet gear assemblies in any of the embodiments described herein.

Figure 8:
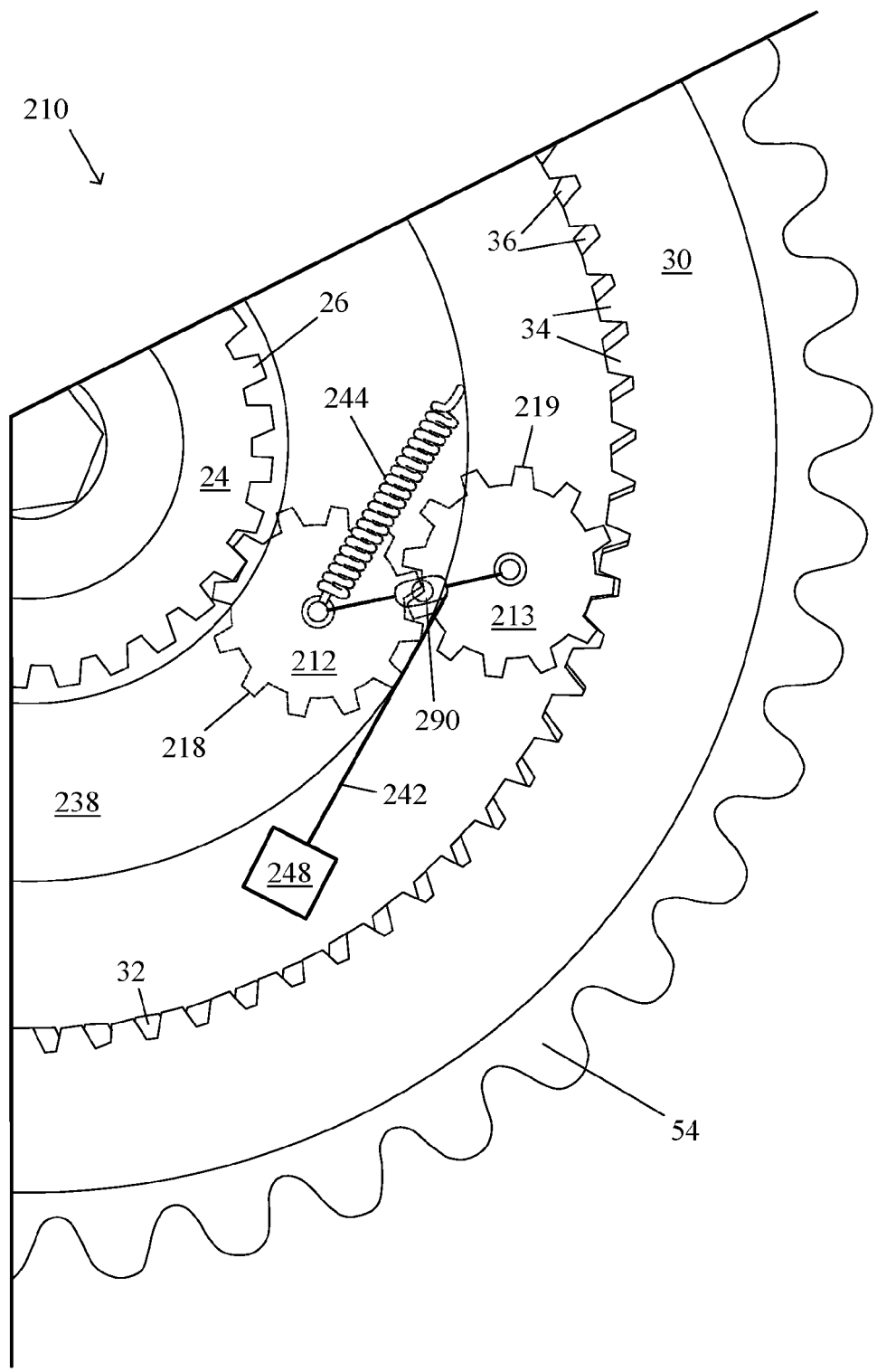
FIG. 8 shows a schematic front view of a section of a planetary drive system with pairs of planet gears.

Referring to FIG. 8, a split ring gear planetary drive 210 includes pairs of planet gears 212, 213 with planet gear teeth 218, 219, respectively, a centrally located sun gear 24 with sun gear teeth 26, and a split ring gear including a sprocket ring gear 30 and a camshaft ring gear 32. A sprocket 54 with sprocket teeth extends radially outward from the sprocket ring gear 30. The ring gears 30, 32 have different numbers of teeth 34, 36, where the difference in the number of teeth is a multiple of the number of pairs of planet gears 212, 213. The ring gear teeth 34, 36 have profiles to allow the ring gears 30, 32 to mesh properly with the outer planet gears 213. The pairs of planet gears 212, 213 are maintained in a fixed rotational relationship to each other by a planetary carrier 238. Although FIG. 8 only shows a portion of the split ring gear planetary drive 210, the full planetary drive preferably includes a plurality of pairs of planet gears, most preferably three pairs of planet gears.

Each pair of planet gears 212, 213 is spring-loaded by a planet gear adjuster to engage the sun gear 24 and ring gears 30, 32 and take up any backlash both between the planets 212, 213 and the sun 24 and the planets 212, 213 and the rings 30, 32. The inner planet gear 212 engages the sun gear 24. The outer planet gear 213 engages the inner planet gear 212 and the ring gears 30, 32. A pivot support 290 couples the inner planet gear 212 to the outer planet gear 213 and is rotatably attached to the carrier 238. A load generator 244, preferably a spring or spring and damper, attached at one end to the inner planet gear 212 and at the other end to the carrier 238, rotationally biases the pivot support 290 to cause the two planet gears 212, 213 to take up backlash both between the planets 212, 213 and the sun 24 and the planets 212, 213 and the rings 30, 32.

The planet gear adjuster preferably includes the pivot support 290, the load generator 244, an extension arm 242, and a mass 248. The extension arm 242 extends from the pivot support 290, and the mass 248 is located at the other end of the extension arm 242. The load generator 244 biases the pivot support 290 in the clockwise direction in FIG. 8 to bias the inner planet gear 212 toward the sun gear 24 and the outer planet gear 213 toward the ring gears 30, 32 at low rotational speeds of the carrier 238, as a result of the orientation angle of the pair of planet gears 212, 213, to take up the backlash both with the sun gear 24 and the ring gears 30, 32.

The mass 248 at the distal end of the extension arm 242 provides an opposing force to the load generator 244 at high rotational speeds as a result of inertia. As the rotational speed of the carrier 238 increases, the inertia of the mass 248 on the end of the extension arm 242 generates an increasing force opposing the force of the load generator 244 to move the extension arm 242 away from the axis of rotation of the carrier 238. This movement of the extension arm 242 rotates the pivot support 290 to a position where the planet gears 212, 213 no longer take up the backlash.

In preferred embodiments, the carrier 238 is piloted and each of the pairs of planet gears 212, 213 has a planet gear adjuster. In alternative embodiments, the carrier 238 is not piloted and at least one, but not all, of the pairs of planet gears 212, 213 has a planet gear adjuster, which provides sufficient control of the backlash for all of the pairs of planet gears in the split ring gear planetary drive 210. In such embodiments, any pairs of planet gears without a planet gear adjuster preferably have a non-pivoting support coupling the inner planet gear 212 to the outer planet gear 213 and attaching to the carrier 238 at a predetermined orientation to maintain the inner planet gear 212 and the outer planet gear 213 at a predetermined orientation with respect to each other and with respect to the carrier 238.

Figure 9:
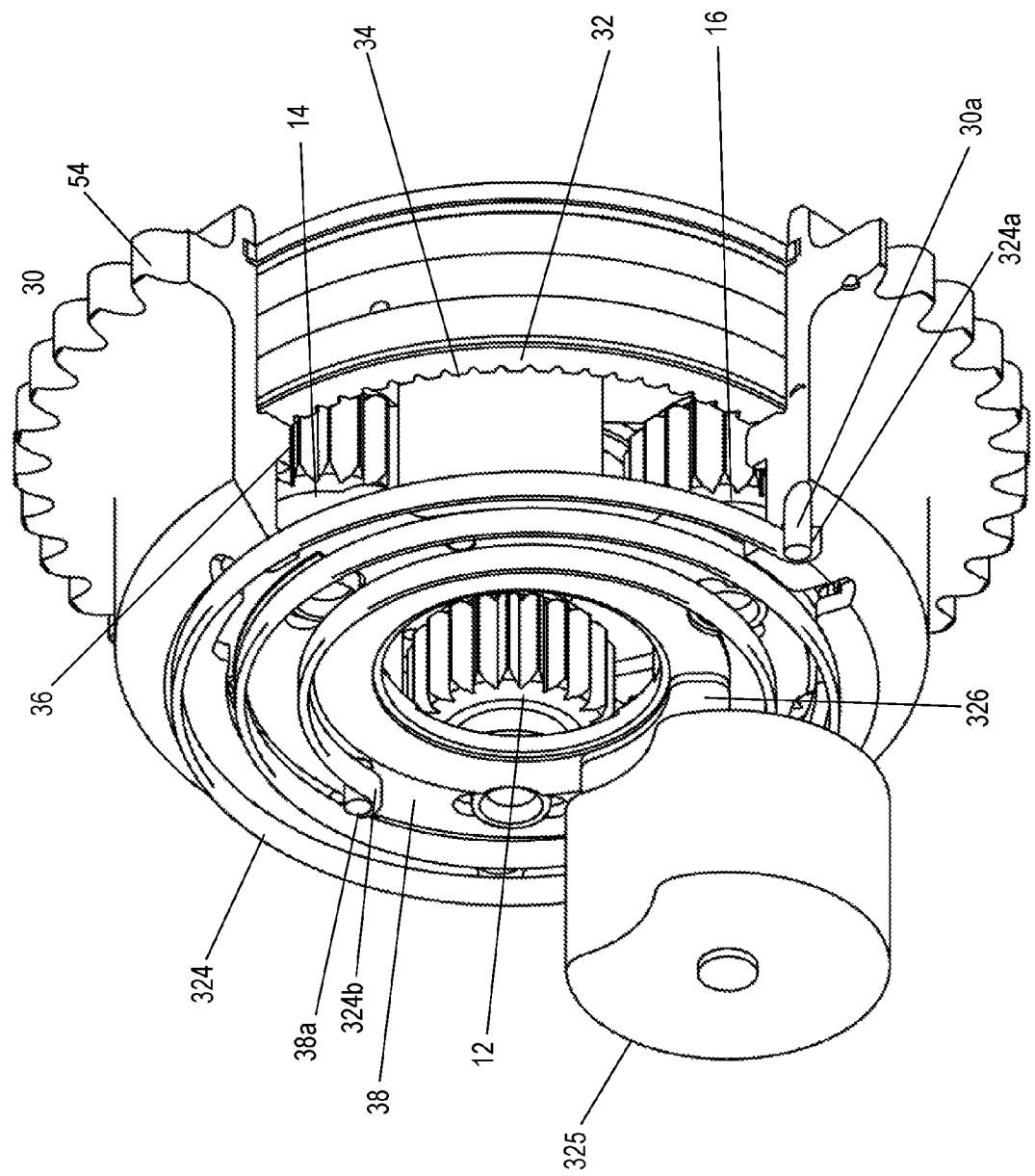
FIG. 9 shows a schematic of a perspective view of phaser with an electric brake.
Figure 10:
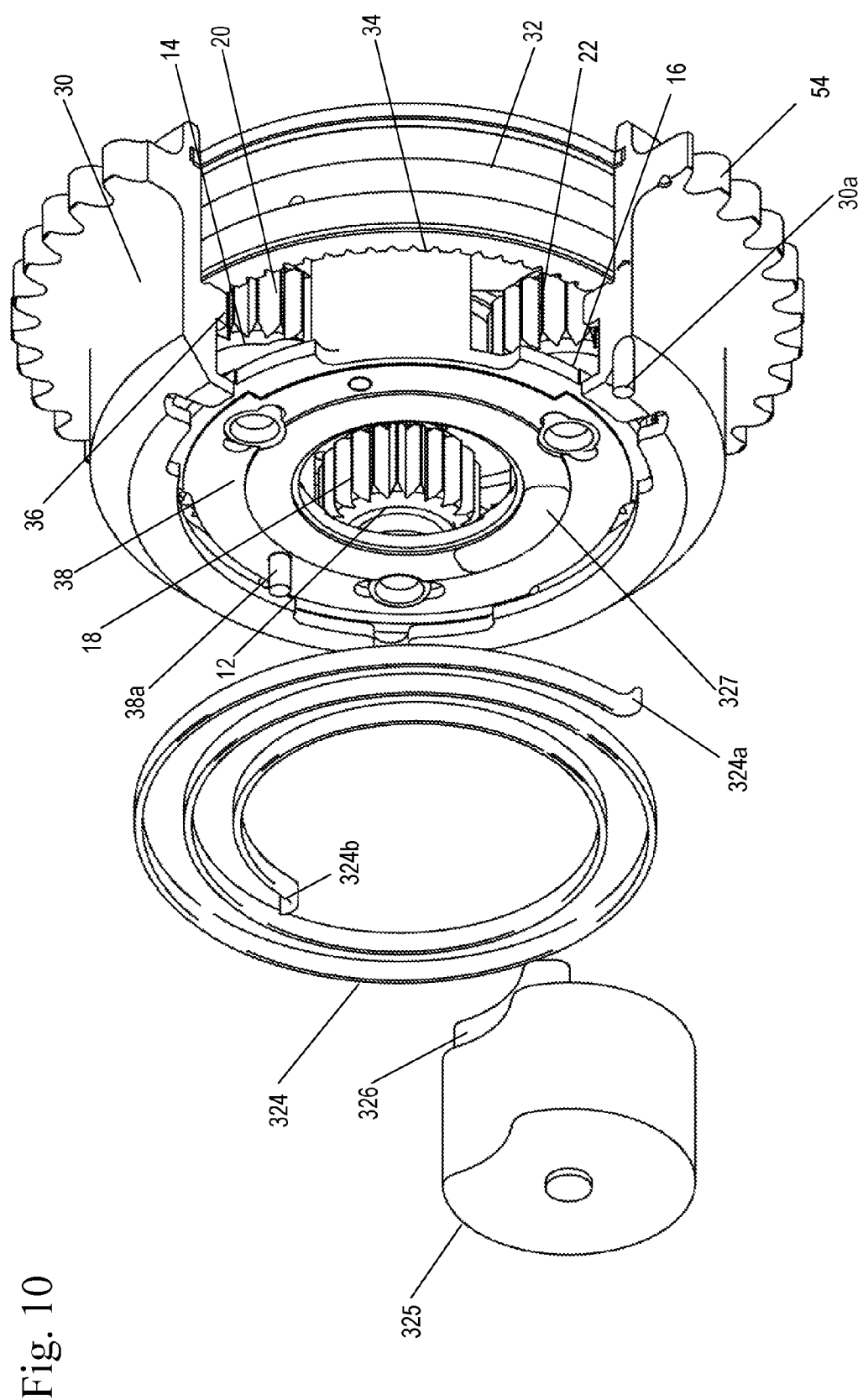
FIG. 10 shows an exploded perspective view of the phaser with the electric brake.

FIGS. 9-10, show an electric phaser with a brake instead of a motor. The phaser has a split ring gear planetary drive or planet gear adjuster 10 which includes planet gears 12, 14, 16 with planet gear teeth 18, 20, 22, respectively, a spring 324, and a split ring gear including a sprocket ring gear 30 and a camshaft ring gear 32. A sprocket 54 with sprocket teeth extends radially outward from the sprocket ring gear 30. The ring gears 30, 32 have different numbers of teeth 34, 36, where the difference in the number of teeth is a multiple of the number of planet gears 12, 14, 16. The ring gear teeth 34, 36 have profiles to allow the ring gears 30, 32 to mesh properly with the planet gears 12, 14, 16. The planet gears 12, 14, 16 are maintained in a fixed rotational relationship to each other by a planetary carrier 38. A first end 324a of the spring 324 is engaged with a tab 30a on the sprocket ring gear 30 and the other end 324b is engaged with a tab 38a of the planetary carrier 38. The spring 324 drives the planetary carrier to rotate in a first direction.

A brake 325 is grounded to a front cover (not shown). The brake is preferably a solenoid and has a brake pad 326. The brake pad 326 can contact the planet carrier 38, for example at contact area 327 indicated in FIG. 10.

During operation of the phaser, the spring 324 drives the planetary carrier 38 and ring gears 30, 32 to rotate in a first direction, and the planetary gears 12, 14, 16 to rotate in a second direction. It should be noted that the ring gear 32 may rotate in the second direction when the planetary carrier 38 and the ring gear 30 rotates in a first direction if the tooth count difference between ring 30 and 32 is reversed (more teeth on ring 30).

When the brake 325, which is not rotating, is applied to the planet carrier 38 with a torque less than the torque of the spring 324, the spring 324 rotates the planet carrier in a first direction, the spring 324 turns the planet carrier 38 at a slight different speed from the ring gears 30, 32, which causes a slightly different speed of one ring gear to the other ring gear which causes a cam phase shift function in a first direction. In such an embodiment, when the spring 324 rotates the planet carrier 38 at a speed faster than the speed of the camshaft and the phaser is moving in the advancing direction.

When the brake 325, which is not rotating, is applied to the planet carrier 38 with a torque greater than the torque of the spring 324, the brake pad 326 of the brake 325 causes the planet carrier 38 to drag and thus rotate at a different speed from the ring gears 30, 32, therefore causing a slightly different speed of one ring gear to the other ring gear which causes a cam phase shift function. In such an embodiment, when the brake 325 is applied, the planet carrier rotates at a speed slower than the speed of the camshaft and the phaser is moving in the retarding direction.

When the brake 325, which is not rotating, is applied to the planet carrier 38 with a torque that is approximately equal to the torque of the spring 324, the planet carrier 38 rotates at the same speed as either of the ring gears 30, 32, since both the ring gears 30, 32 rotate in unison, a constant cam phase position is maintained. It should be noted that the torque of the brake may be controlled through closed loop control.

In this way, a very high numerical ratio is obtained and the camshaft is phased either plus or minus from the nominal rotational relationship of the crankshaft to the camshaft.

A load generator 44 may be attached at one end to the planetary carrier 38 of the phaser of FIGS. 9-10 and attached at the other end to an extension arm 42 as discussed above in FIGS. 1, 3-6. The planet gear adjuster or reducer may include an extension arm 42 and an eccentric pin 46 and may extend from the eccentric pin 46, around which the first planet gear 12 is mounted.

Alternatively, the carrier 38 of the phaser shown in FIGS. 9-10 may be piloted as in FIGS. 7-8 with a physical stop 180 extending from the carrier 38.

In another embodiment, the planet gears 12, 14, 16 of the phaser of FIGS. 9-10 would be replaced with inner and outer planetary gears 212, 213 and may be spring loaded to take up backlash between the planetary gears and the rings 30, 32 as described above in FIG. 8.

Figure 11:
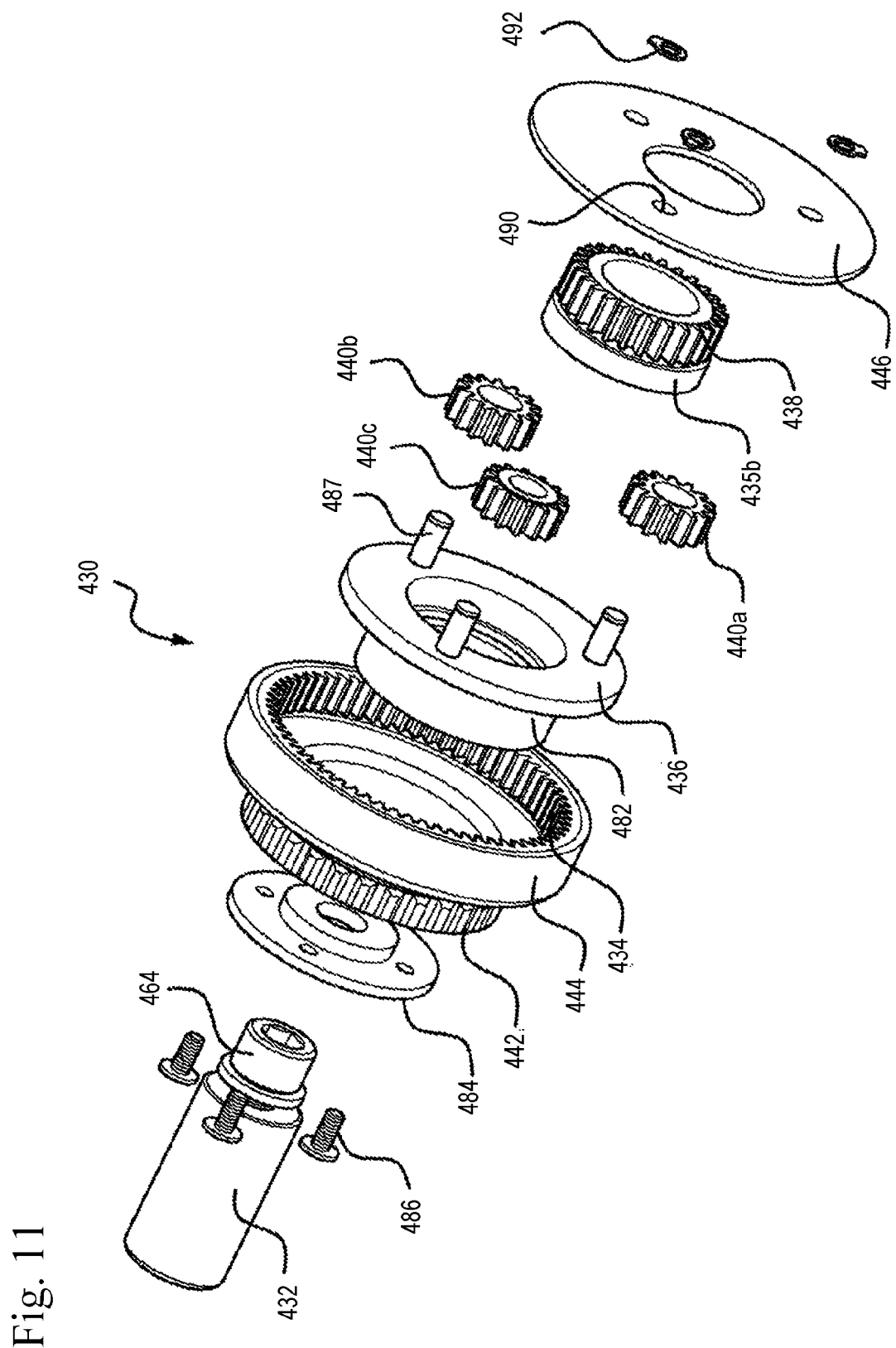
FIG. 11 is an exploded perspective view of an electric cam phaser illustrating a sprocket housing, a ring gear, and a phaser sprocket formed as a rotatable component and engageable with a cover plate for holding a planetary gear assembly within the sprocket housing.
Figure 12A:
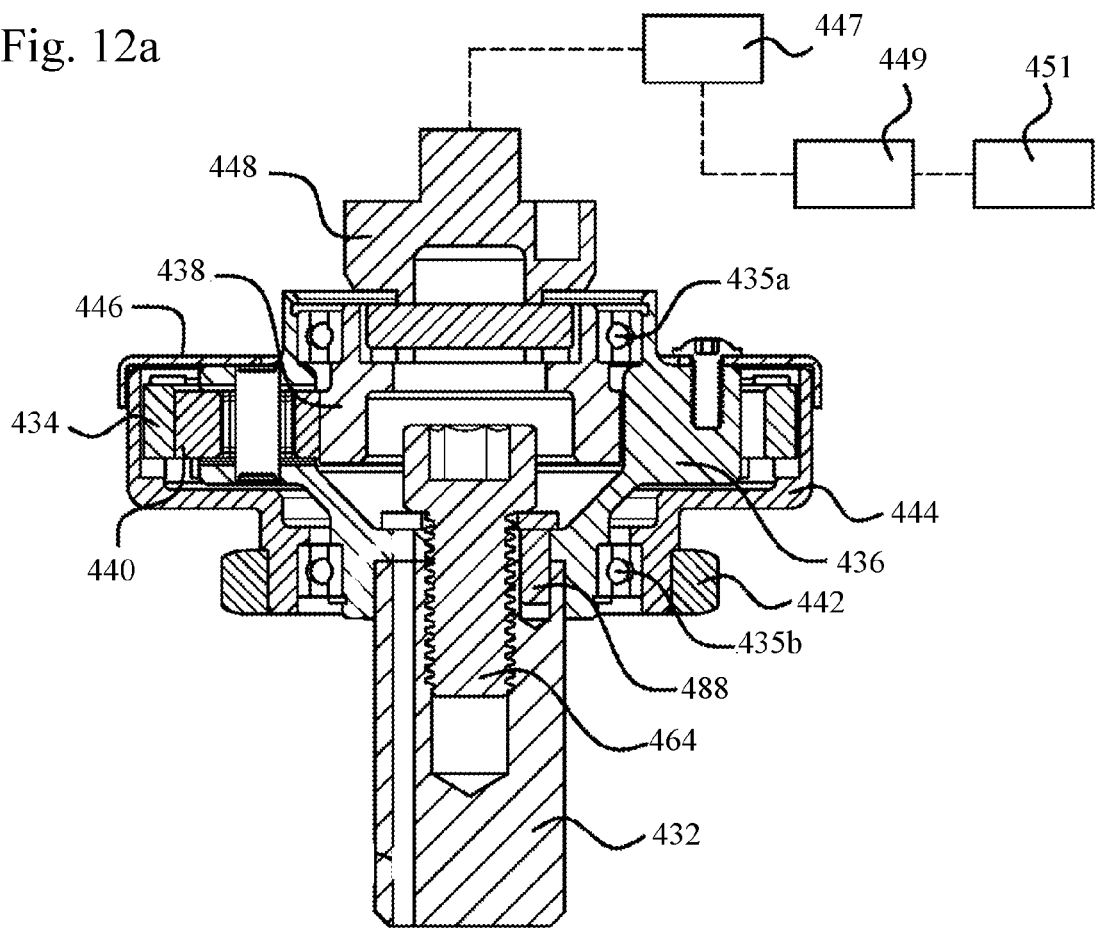
FIG. 12a is a sectional view of an electric cam phaser illustrating a sprocket housing and a phaser sprocket formed separately from a ring gear, a cover plate for holding a planetary gear assembly within the sprocket housing, and a adapter for connecting to a sun gear.
Figure 12B:
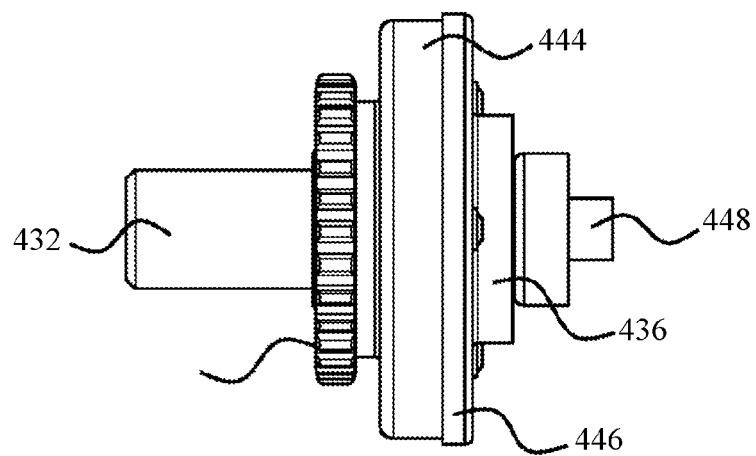
FIG. 12b is a plan view of the electric cam phaser shown in FIG. 12a depicting the phaser assembly connected between a camshaft and an adapter.

FIGS. 11 and 12a-12b show an electric phaser of another embodiment. The electric cam phaser dynamically adjusts an angular position of a camshaft of an internal combustion engine with respect to an engine crankshaft. The phaser can include a phaser sprocket driven by an endless loop power transmission member connected to a drive sprocket mounted for rotation with the engine crankshaft. The electric cam phaser can include a planetary gear assembly having a ring gear driven by the phaser sprocket, a planetary gear carrier connected to the camshaft, and a sun gear. The phaser sprocket, planetary gear carrier, and sun gear can be rotatable about a common axis. The carrier can support at least one rotatable planetary gear operably engageable with the ring gear and the sun gear. The sun gear can drive the at least one rotatable planetary gear in rotation for relative movement of the carrier. Rotational movement of the carrier driven by the sun gear within the phaser sprocket can adjustably vary a cam phaser position of the camshaft relative to the crankshaft. The sun gear can be fixed for maintaining a cam phase position of the camshaft relative to the crankshaft and can be driven with an electric motor to provide an adjustable angular position for varying the cam phase position.

Referring now to FIGS. 11-12b, an electric cam phaser 430 for controlling the timing of valve opening and/or closing through angular position of a camshaft 432 relative to a crankshaft is illustrated. The camshaft 432 can be driven in rotation by connection to a crankshaft of an internal combustion engine. The electric cam phaser 430 can dynamically adjust an angular position rotational relationship of the camshaft 432 with respect to the crankshaft. A phaser sprocket 442 can be driven by an endless loop power transmission member connected to a drive sprocket mounted for rotation with the engine crankshaft. The electric cam phaser 430 can include a planetary gear assembly having a ring gear 434, a planetary gear carrier 436, and a sun gear 438, all rotatable about a common axis. The carrier 436 can support at least one rotatable planetary gear 440 in meshing engagement between the ring gear 434 and the sun gear 438. The sun gear 438, the ring gear 434, and the at least one planetary gear 440 can have helical teeth, if desired. The phaser sprocket 442 can drive the ring gear 434. The sun gear 438 can be fixed for maintaining an angular cam phase position of the camshaft 432 relative to the crankshaft and can have an adjustable angular position for relatively changing the angular position rotational relationship of the camshaft 432 to thereby varying a phasing of the camshaft 432 relative to the crankshaft.

As illustrated in FIG. 11, the electric cam phaser 430 can include a sprocket housing 444 rotatable about a common axis for rotation with a planetary gear assembly. The sprocket housing 444 can be connected to a phaser sprocket 442 for rotation therewith. A ring gear 434 can form an integral part of the sprocket housing 444 for rotation therewith. The ring gear 434 can be integrally formed on an inner diameter of the sprocket housing 444. The ring gear 434 can be engageable with at least one rotatable planetary gear 440. The sprocket housing 444, phaser sprocket 442, and ring gear 434 can be manufactured and assembled as a single unitary monolithic component for engagement in the electric cam phaser 430. As illustrated in FIG. 11, the at least one rotatable planetary gear 440 can include a first, a second, and a third planetary gear 440a, 440b, 440c. A planetary gear carrier 436 can include a drive flange 482 to be connected through the sprocket housing 444 and the phaser sprocket 442 for assembly to a carrier adapter 484 with a plurality of screws 486, a center bolt 464, and a set screw 488, best seen in FIG. 12a, for attachment to the camshaft 432. The carrier adapter 484 can be connected for rotation with the cam shaft 432. The carrier adapter 484 can rotatable drive the camshaft 432 through the carrier adapter 484, center bolt 464, and set screw 488 connection. The carrier 436 can include a plurality of stub shafts 487 supporting the first, second, and third planetary gears 440a, 440b, 440c for rotation thereon. The plurality of planetary gears 440a, 440b, 440c are connected in intermeshing engagement with the ring gear 434 and the sun gear 438. The electric cam phaser 430 can include a cover plate 446 having a plurality of apertures 490 for attaching the cover plate 446 to the planetary gear carrier 436 in order to capture the planetary gears 440a, 440b, 440c on the plurality of stub shafts 487. The cover plate 446 can close an open end of the carrier 436 for enclosing the planetary gear assembly. By way of example and not limitation, the cover plate 446 can be secured to the carrier 436 with a plurality of retaining ring clips 492 secured to the outer ends of the plurality of stub shafts 487. As illustrated in the electric cam phaser of FIG. 12B, by way of example and not limitation, the cover plate 446 can be secured to the carrier 436 with a plurality of bolts 492 extending through the plurality of apertures defined by the cover plate 446. By way of example and not limitation, the electric cam phaser 30 can include a first bearing 435a for supporting the sun gear 438 for rotation with respect to the planetary gear carrier 436, a second bearing 435b for supporting the planetary gear carrier for rotation with respect to the sprocket housing 444.

As further illustrated in FIGS. 12A-12B, the electric cam phaser 430 can include an adapter 448 connected to the sun gear 438. As illustrated in FIG. 12A, the adapter 448 can be connected to an electric motor 447. The sun gear 438 can be driven in rotational movement by the electric motor 447, thereby changing an angular position of the carrier 436 resulting in a cam phase position change of the camshaft 432 relative to the crankshaft. At least one sensor 449 can be provided to supply a feedback signal to an engine control unit or controller 451 to indicate a position of crankshaft relative to the camshaft 424 to determine if any cam phase position adjustment through the sun gear 438 is required. If a cam phase position adjustment is required, the electric motor 447 can be driven by the controller to move the cam phase position in either rotational direction, advancing or retarding, toward the desired location through rotational movement of the sun gear 438, thereby causing relative rotation of the at least one planetary gear 440 driving the of the carrier 436 and connected camshaft 432. In operation, the crankshaft of the internal combustion engine can rotate for driving the camshaft 432 through the sprocket 442 and the electric cam phaser 430 can change the relative angular position of the camshaft 432 relative to the crankshaft through rotation of the sun gear 438. The ratio of the number of teeth located on the sprockets and the ration of the gears of the planetary gear assembly are chosen, such that, when the sun gear 438 is held stationary or in a fixed position, the at least one planetary gear 440 can rotate around the sun gear 438 and relatively move the carrier 436 such that the camshaft 432 can be normally driven at one half crankshaft speed in a fixed phase relationship, as is conventional in a four stroke cycle engine. The electric motor 447 can be driven in forward or reverse directions to either advance or retard the camshaft phase angle, controlling the opening and closing of associated internal combustion engine valves with respect to the timing of the crankshaft. In order to change the phase relationship of the camshaft 432 with respect to the crankshaft while the engine is operating, the electric motor 447 can be rotated by the controller 451 in a desired direction thereby changing the angular position of the camshaft through rotation of the sun gear 438.

A load generator 44 may be attached at one end to the planetary carrier 38 of the phaser of FIGS. 11-12B and attached at the other end to an extension arm 42 as discussed above in FIGS. 1, 3-6. The planet gear adjuster may include an extension arm 42 and an eccentric pin 46 and may extend from the eccentric pin 46, around which the first planet gear 12 is mounted.

Alternatively, the carrier 38 of the phaser shown in FIGS. 11-12B may be piloted as in FIGS. 7-8 with a physical stop 180 extending from the carrier.

In another embodiment, the planet gears 440a, 440b, 440c of the phaser of FIGS. 11-12B may each be replaced with inner and outer planetary gears 212, 213 and spring loaded to take up backlash between the sun gear 438 and the planet gears 440a, 440b, 440c and the planet gears 440a, 440b, 440c and the ring gears 434 as described above in FIG. 8.

In some embodiments, the pairs of planet gears each have the same number of teeth. In other embodiments, the numbers of teeth of the planet gears differs to provide different frequencies for reduced operational NVH.

Although the shapes of the gear teeth for the sun gears, planet gears, and ring gears are only shown schematically in the drawings, the gear teeth are preferably shaped to have profiles such that the load from the load generator at low rotational speeds forces the meshing gear teeth into each other to reduce or eliminate backlash. Any gear tooth shape, including those known in the art, that accomplishes this function may be used within the spirit of the present invention.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of removing backlash from a planetary gear reducer of an engine, the planetary gear reducer comprising a sun gear, a ring gear around the sun gear, and a plurality of planetary gears connected to a planet carrier by pins, the planetary gears meshing with the sun gear and the ring gear, the method comprising the steps of:

providing a centrifugally actuated device coupled to a pin of at least one of planetary gears, such that radially inward movement of a first end of the centrifugally actuated device moves the planetary gear in a first direction which minimizes backlash between the planetary gear and the ring gear;

biasing the first end of the centrifugally actuated device radially inward toward the planet carrier, such that the planetary gear is moved in the first direction; and rotating the planet carrier at a rotational speed sufficient to overcome the biasing, causing centrifugal force to move the end of the centrifugally actuated device radially outward, moving the planetary gear in a direction opposite the first direction.

2. The method of claim 1, wherein the centrifugally actuated device comprises an extension arm with a first end with a mass, a second end pivotally coupled to the pin of the at least one planetary gear, and a length therebetween.

3. The method of claim 1, in which the pin coupled to the centrifugally actuated device is an eccentric pin having a cylindrical shape.

4. An electric phaser for dynamically adjusting a rotational relationship of a first shaft relative to a second shaft of an engine, comprising:
   a planetary gear reducer comprising:
      a sun gear comprising a plurality of sun gear teeth;
      a plurality of planetary gears arranged around the sun gear, each planetary gear comprising a plurality of planetary teeth maintaining the planetary gear in meshing engagement with the sun gear teeth;
      a planet carrier being rotatable with the plurality of planetary gears and connected to the planetary gears through pins;
      a ring gear with a set of teeth fixed to the second shaft;
      a centrifugally actuated device comprising an extension arm with a first end with a mass, a second end pivotally coupled to the pin of the at least one planetary gear, and a length therebetween, such that radially inward movement of the first end of the centrifugally actuated device moves the planetary gear in a first direction which minimizes backlash between the planetary gear and the ring gear; and
      a load generator coupled to the planet carrier and the centrifugally actuated device, biasing the first end of the centrifugally actuated device radially inward;
      such that when the planet carrier is rotating at a rotational speed less than a speed sufficient to overcome the biasing of the load generator, the at least one planetary gear is moved by the centrifugally actuated device to minimize backlash between the planetary gears and the ring gear, and when the planet carrier is rotated at a higher rotational speed, centrifugal force moves the first end of the centrifugally actuated device radially outward, moving the planetary gear in a direction opposite the first direction.

5. The electric phaser of claim 4, wherein the centrifugally operated device further comprises:
   an eccentric pin having a cylindrical shape, the eccentric pin extending through a center of the at least one of the planetary gear of the plurality of planetary gears and connected to the second end of the extension arm; and
   a pair of pin extensions extending from a top and a bottom of the eccentric pin and having circumferential surfaces off-center with respect to a center of the cylindrical surface of the eccentric pin, wherein the pin extensions rotatably mount in the carrier such that the centrifugally actuated device is rotatable with respect to the planet carrier and with respect to the planetary gear teeth of the at least one planetary gear;
   when the planet carrier is rotating at a rotational speed less than a speed sufficient to overcome the biasing of the load generator, the eccentric pin forces the at least one planetary gear toward the ring gear to minimize backlash between the at least one planetary gear and the ring gear.

6. The electric phaser of claim 5, wherein when the planet carrier is rotated at a higher rotational speed, centrifugal force moves the first end of the extension arm radially outward, simultaneously rotating the eccentric pin to a pin position where the eccentric pin no longer forces the at least one planetary gear toward the ring gear to take up the backlash.

7. The electric phaser of claim 4, further comprising a stop extending from the planet carrier, limiting rotation of the centrifugally actuated device from contacting the ring gear.

8. An electric phaser for dynamically adjusting a rotational relationship of a first shaft relative to a second shaft of an engine, comprising:
   a planetary gear reducer comprising:
      a sun gear comprising a plurality of sun gear teeth;
      a plurality of planetary gears arranged around the sun gear, each planetary gear comprising a plurality of planetary teeth maintaining the planetary gear in meshing engagement with the sun gear teeth;
      a planet carrier being rotatable with the plurality of planetary gears and connected to the planetary gears through pins;
      a second ring gear rotatable with a second shaft, the second ring gear comprising a plurality of second ring gear teeth maintaining the second ring gear in meshing engagement with the planetary gear teeth of each of the planetary gears;
      a first ring gear rotatable with a first shaft, the first ring gear comprising a plurality of first ring gear teeth maintaining the first ring gear in meshing engagement with the planetary gear teeth of each of the planetary gears;
      a centrifugally actuated device comprising an extension arm with a first end with a mass, a second end pivotally coupled to the pin of the at least one planetary gear, and a length therebetween, such that radially inward movement of the first end of the centrifugally actuated device moves the planetary gear in a first direction which minimizes backlash between the planetary gear and the ring gear; and
      a load generator coupled to the planet carrier and the centrifugally actuated device, biasing the first end of the centrifugally actuated device radially inward;
      such that when the planet carrier is rotating at a rotational speed less than a speed sufficient to overcome the biasing of the load generator, the at least one planetary gear is moved by the centrifugally actuated device to minimize backlash between the planetary gears and the ring gear, and when the planet carrier is rotated at a higher rotational speed, centrifugal force moves the first end of the centrifugally actuated device radially outward, moving the planetary gear in a direction opposite the first direction.

9. The electric phaser of claim 8, wherein the centrifugally operated device further comprises:
   an eccentric pin having a cylindrical shape, the eccentric pin extending through a center of the at least one of the planetary gear of the plurality of planetary gears and connected to the second end of the extension arm; and
   a pair of pin extensions extending from a top and a bottom of the eccentric pin and having circumferential surfaces off-center with respect to a center of the cylindrical surface of the eccentric pin, wherein the pin extensions rotatably mount in the carrier such that the centrifugally actuated device is rotatable with respect to the planet carrier and with respect to the planetary gear teeth of the at least one planetary gear;
   when the planet carrier is rotating at a rotational speed less than a speed sufficient to overcome the biasing of the load generator, the eccentric pin forces the at least one planetary gear toward the ring gear to minimize backlash between the at least one planetary gear and the ring gear.

10. The electric phaser of claim 9, wherein when the planet carrier is rotated at a higher rotational speed, centrifugal force moves the first end of the extension arm radially outward, simultaneously rotating the eccentric pin to a pin position where the eccentric pin no longer forces the at least one planetary gear toward the ring gear to take up the backlash.

11. The electric phaser of claim 8, further comprising a stop extending from the planet carrier, limiting rotation of the centrifugally actuated device from contacting the ring gear.

12. An electric phaser for dynamically adjusting a rotational relationship of a first shaft relative to a second shaft of an engine, comprising:
- a planetary gear reducer comprising:
  - a sun gear comprising a plurality of sun gear teeth;
  - a plurality of inner planet gears arranged around the sun gear, each inner planet gear comprising a plurality of inner planet teeth maintaining the inner planet gear in meshing engagement with the sun gear;
  - a plurality of outer planet gears, each outer planet gear comprising a plurality of outer planet teeth maintaining the outer planet gear in meshing engagement with one of the plurality of inner planet gears;
  - a second ring gear driven by the second shaft, the second ring gear comprising a plurality of second ring gear teeth maintaining the second ring gear in meshing engagement with the outer planet gears;
  - a first ring gear rotatable with the first shaft, the first ring gear comprising a plurality of first ring gear teeth maintaining the first ring gear in meshing engagement with the outer planet gears;
- a planet carrier being rotatable with the outer planet gears through pins;
- a centrifugally actuated device comprising a pivot support coupling an inner planetary gear to an outer planetary gear and being rotatably coupled to the planet carrier, such that radially inward movement of the centrifugally actuated device moves the outer planetary gear in a first direction which minimizes backlash between the outer planetary gear and the ring gear; and
- a load generator coupled to the planet carrier and the centrifugally actuated device, biasing the centrifugally actuated device radially inward;
- such that when the planet carrier is rotating at a rotational speed less than a speed sufficient to overcome the biasing of the load generator, the at least one outer planetary gear is moved by the centrifugally actuated device to minimize backlash between the outer planetary gears and the ring gear, and when the planet carrier is rotated at a higher rotational speed, centrifugal force moves the centrifugally actuated device radially outward, moving the outer planetary gear in a direction opposite the first direction.

13. The electric phaser of claim 12, further comprising a stop extending from the planet carrier, limiting rotation of the centrifugally actuated device from contacting the ring gear.

\* \* \* \* \*